United States Patent [19]

Dogliotti et al.

[11] 4,048,572
[45] Sept. 13, 1977

[54] ADAPTIVE CORRECTION OF PHASE ERRORS IN NONCOHERENT DEMODULATION OF CARRIER ASYMMETRICALLY MODULATED WITH DIGITAL SIGNALS

[75] Inventors: Renato Dogliotti; Umberto Mazzei, both of Turin; Umberto Mengali, Pisa, all of Italy

[73] Assignee: CSELT - Centro Studi e Laboratori Telecommunicazioni S.p.A., Turin, Italy

[21] Appl. No.: 752,168

[22] Filed: Dec. 20, 1976

[30] Foreign Application Priority Data

Dec. 18, 1975 Italy .................................. 70116/75

[51] Int. Cl.$^2$ ........................................ H03K 9/04
[52] U.S. Cl. .................................. 329/104; 328/155; 329/110
[58] Field of Search ................. 329/104, 107, 50, 110; 328/162, 163, 155; 325/480

[56] References Cited

U.S. PATENT DOCUMENTS

| | | | |
|---|---|---|---|
| 3,761,829 | 9/1973 | Spaulding | 329/104 |
| 3,944,939 | 3/1976 | LeMouel | 329/104 |
| 3,971,996 | 7/1976 | Motley et al. | 329/104 |

*Primary Examiner*—John Kominski
*Attorney, Agent, or Firm*—Karl F. Ross

[57] ABSTRACT

Digital signals asymmetrically modulated upon a carrier, with suppressed or vestigial second sideband, are recovered at a receiver by pseudo-coherent demodulation or periodic sampling and subsequent digitization to provide a train of raw data signals X from which a train of raw quadrature signals Y is derived by digital filtration. Signals X and Y are fed to a phase corrector where they are cross-multiplied with a sine function and a cosine function of a feedback signal W, approximating a corrective phase angle $\hat{\phi}(t)$, to yield a corrected in-phase signal X' and a corrected quadrature signal Y'. Signal X' is quantized to provide a reference signal $\hat{c}$ which, upon subtraction from signal X', produces a bipolar difference signal whose sign bit is multiplied with either the entire signal Y' or its sign bit to provide an error signal V. The latter is averaged over a number of clock cycles, resulting in the feedback signal W whose trigonometric functions are read out from a memory for utilization in the generation of corrected signals X' and Y'.

12 Claims, 6 Drawing Figures

ADAPTIVE CORRECTION OF PHASE ERRORS IN NONCOHERENT DEMODULATION OF CARRIER ASYMMETRICALLY MODULATED WITH DIGITAL SIGNALS

FIELD OF THE INVENTION

Our present invention relates to a receiver for digital signals which are noncoherently recovered from a carrier modulated asymmetrically with these signals, i.e., with complete or partial suppression of the second sideband.

BACKGROUND OF THE INVENTION

In a system using such single-sideband (SSB) or vestigial-sideband (VSB) modulation, only a coherent demodulation at the receiving end will prevent signal distortions due to phase errors. Such coherent demodulation, however, requires the transmission of a pilot tone — harmonically related to carrier frequency — outside the signal band. The pilot tone, aside from being itself subject to so-called phase jitters during transmission, requires the expenditure of additional energy and also occupies a portion of the available frequency range which would otherwise be available to neighboring signal bands. These phase jitters, particularly annoying in telephone channels, dictate a broadening of the band allotted to the pilot tone which is contrary to the desiderata of low noise interference and limited frequency spread.

Various systems have therefore been devised which dispense with the pilot tone and recover the original base-band signal by phase or amplitude demodulation from an asymmetrically modulated carrier. Foremost among these techniques is the use of a locally generated oscillation whose frequency approximates that of the carrier and which is heterodyned with the incoming wave to yield the base-band signal with as little distortion as possible. Reference may be made in this connection to U.S. Pat. No. 3,634,773 in the name of Hisashi Kobayashi and to an article by that inventor entitled "Simultaneous Adaptive Estimation and Decision Algorithm for Carrier-Modulated Data-Transmission Systems", IEEE Transactions on Communication Vol. COM-19, No. 3, pages 268 - 280, June 1971. The Kobayashi system employs adjustable equalizers of the so-called "transverse-filter" type.

OBJECT OF THE INVENTION

The object of our present invention is to provide an improved method of and means for adaptively correcting phase errors occurring in the noncoherent demodulation of an incoming carrier asymmetrically modulated with digital signals representing alphanumerical characters, for example.

SUMMARY OF THE INVENTION

In accordance with our present invention, a train of raw data signals is fed to a first input of an arithmetic unit in a phase corrector whose second input receives a train of raw quadrature signals derived from these data signals, both the data signals and the quadrature signals being of bipolar nature; if these signals are in binary form, their polarity is conventionally indicated by a sign bit accompanying a number of modulus bits. A corrected in-phase signal and a corrected quadrature signal appear on a first and a second output, respectively, of the arithmetic unit. The corrected in-phase signal is quantized in a decision network to yield a reference signal whose subtraction from the in-phase signal produces a difference signal from which a feedback signal is obtained by multiplying at least a part of the difference signal (specifically its sign bit) with all or part of the corrected quadrature signal (inclusive of the sign bit). The feedback signal approximates a corrective phase angle and is converted into a pair of conjugate trigonometric functions, specifically its sine and its cosine, which are then cross-multiplied with the raw data and quadrature signals within the arithmetic unit to produce the two mutually conjugate output signals thereof.

BRIEF DESCRIPTION OF THE DRAWING

The above and other features of our invention will now be described in detail with reference to the accompanying drawing in which.

SPECIFIC DESCRIPTION

Figure 1A:
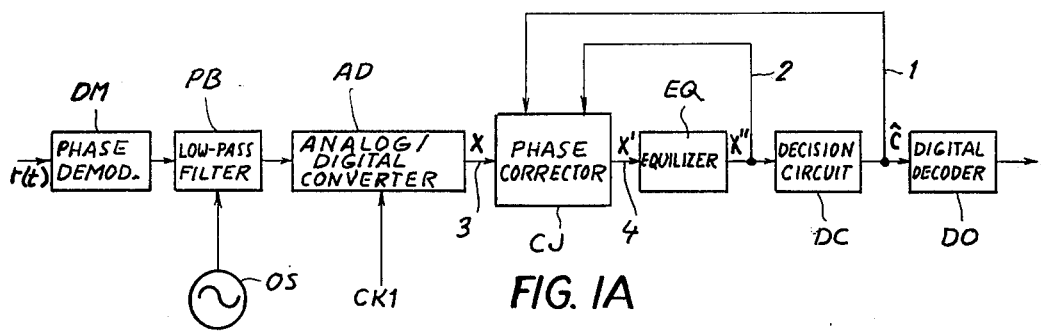
FIG. 1A is a block diagram of a communication system including a phase corrector according to our invention.

In FIG. 1A we have shown an incoming phase-modulated carrier wave $r(t)$ of single-sideband (SSB) or vestigial-sideband (VSB) type fed to a conventional phase demodulator DM to which a reference wave, having approximately the frequency of the carrier, is applied from a local oscillator OS. The bipolar raw data signals recovered by pseudo-coherent demodulation in component DM traverse a low-pass filter PB for the removal of higher harmonics and are then fed to a conventional analog/digital converter AD controlled by locally generated clock pulses CK1. The resulting digital signal X, in the form of a binary word including the usual polarity or sign bit, appears on an input multiple 3 of a phase corrector CJ embodying our present invention. An output multiple 4 of phase corrector CJ carries a corrected signal X', preferably via a digital equalizer EQ, to a conventional decision circuit DC generating a quantized reference signal $\hat{c}$ by comparing the phase-corrected signal with certain predetermined thresholds. This quantized signal is transmitted to a nonillustrated load via an optional digital decoder DO which will be needed only if a complementary encoder (e.g. of the "partial response" type) is provided at the transmission end.

The reference signal $\hat{c}$ is fed back to phase corrector CJ via a line 1; another line 2 carries the corrected signal X' back to the phase corrector, either in its original form or as a signal X" in the presence of the optional equalizer EQ. That equalizer may be of a type described in commonly owned U.S. Pat. Nos. 3,978,435 or 3,984,789.

Figure 1B:
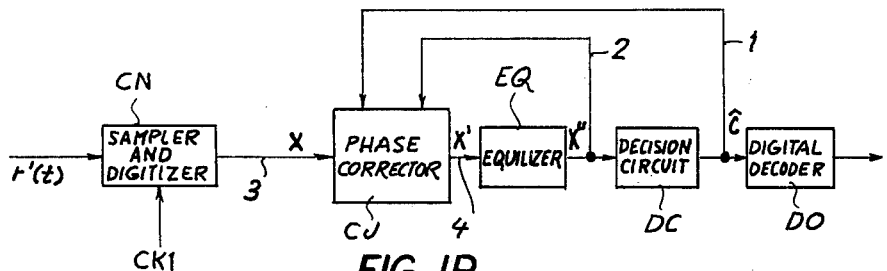
FIG. 1B is a block diagram similar to FIG. 1A, showing a slightly modified communication system including our improved phase corrector.

FIG. 1B shows a similar arrangement wherein, however, the raw data signals are obtained without coherent demodulation from an amplitude-modulated carrier $r'(t)$ with the aid of a sampling and digitizing circuit CN of conventional type periodically triggered by clock pulses CK1.

If P is the amplitude of the data signal in the base band modulated upon the carrier, then a residual phase error $\phi(t)$ on pseudo-coherent demodulation will result in a digitized input signal $$X = P\cos\phi(t) - Q\sin\phi(t) \tag{1'}$$

from which a conjugate signal $$Y = P\sin\phi(t) + Q\cos\phi(t) \tag{1''}$$

can be derived by a linear transformation, as by the well-known Hilbert transform in the case of SSB modulation. Thus, with $\phi(t) = O$ we have $X = P$ and $Y = O$.

We have found, in accordance with our present invention, that a corrective parameter in the form of an optimized phase angle $\hat{\phi}(t)$ can be obtained with the aid of the following algorithm:

$$\hat{\phi}(t) \approx E[\hat{c}.Y'] \tag{2}$$

where $\hat{c}$ is the quantized reference signal in the output of decision circuit DC (FIGS. 1A and 1B) whereas Y' is a conjugate of signal X' in the output of phase corrector CJ. The operator E denotes the averaged value of the bracketed product obtained, for example, by recursive filtration over a number of clock cycles as discussed in the above-identified commonly owned prior patents.

This algorithm evaluates differences in correlation existing during successive timing intervals or clock cycles between the recovered signal and the phase angle $\phi(t)$. A formula similar to expression (2) has been mentioned, but not developed any further, in an article by E. D. Gibson and M. A. Coloyannides published in ICC 1973, pages 2-31/2-38.

We have further found, in accordance with our present invention, that this algorithm can be made easier to implement by approximating the corrective parameter $\hat{\phi}(t)$ by a feedback signal of the form $$W = E[S(X' - \hat{c}).Y'] \approx \hat{\phi}(t) \tag{3}$$

or, still simpler,
$$W^* = E[S(X' - \hat{c}).S(Y')]; \tag{4}$$

in equations (3) and (4) the operator S represents the sign (as distinct from the magnitude or modulus) of the quantity following in parentheses, i.e., the polarity in the case of an analog signal and the sign bit in the case of its digitized equivalent.

Upon establishment of the optimized phase parameter $\hat{\phi}(t)$, or its approximation W or W* according to expression (3) or (4), we can obtain the phase-corrected in-phase and quadrature output signals X' and Y' according to the following relationships:

$$X' = X\cos\phi(t) + Y\sin\phi(t) \tag{5'}$$

$$Y' = -X\sin\phi(t) + Y\cos\phi(t) \tag{5''}$$

Thus, pursuant to these latter equations, signals X' and Y' in the output of phase corrector CJ are derived from its input signals X and Y by a rotation of the axes in a system of cartesian coordinates to which the angle $\hat{\phi}(t)$ is referred.

Upon substituting the values of X and Y from equations (1') and (1'') in equations (5') and (5'') we find that $$X' = P\cos[\phi(t) - \hat{\phi}(t)] - Q\sin[\phi(t) - \hat{\phi}(t)] \tag{6'}$$

and
$$Y' = -P\sin[\phi(t) - \hat{\phi}(+)] + Q\cos[\phi(t) - \hat{\phi}(t)] \tag{6''}$$

whence $X' = P$ and $Y' = Q$ if $\phi(t) - \hat{\phi}(t) = 0$.

Figure 2:
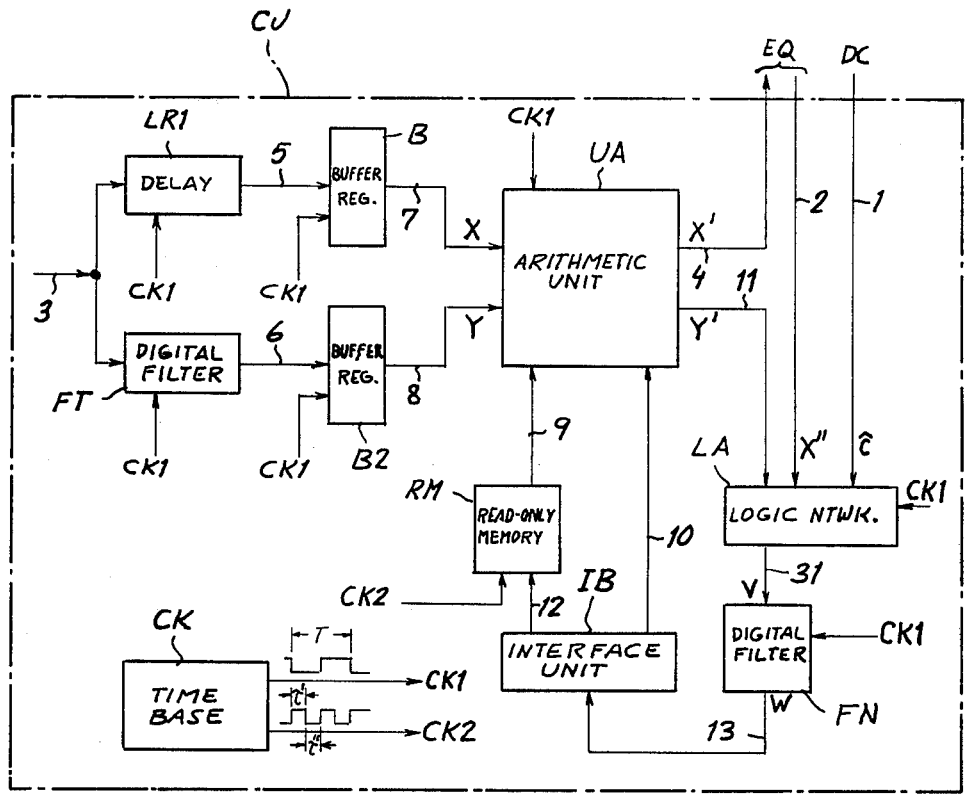
FIG. 2 is a more detailed block diagram of the phase corrector shown in FIGS. 1A and 1B.

Reference will now be made to FIG. 2 showing particulars of the phase corrector CJ. Input line 3 of this phase corrector is split into two branches respectively terminating at a delay line LR1 and at a digital filter FT which may be of the conventional transverse type described by Kobayashi (see above). Line LR1 is designed to match the delay inherent in the operation of filter FT. A time base CK generates clock pulses CK1 and CK2, pulses CK2 having a recurrence frequency or cadence twice that of pulses CK1. Delay line LR1 and filter FT, stepped by clock pulses CK1, have outputs 5 and 6 extending to respective buffer registers B1 and B2 also controlled by these clock pulses. Registers B1 and B2 have outputs 7 and 8 delivering the digitized raw input signals X and Y to an arithmetic unit UA likewise receiving the pulses CK1 from time base CK. Lines 5, 7 and 6, 8 may be considered part of an in-phase channel and a quadrature channel, respectively. As indicated in FIG. 2, clock pulses CK1 measure a cycle T divided into two halves $\tau'$ and $\tau''$ equal to a period of clock pulse CK2.

Unit UA, generating the corrected in-phase and quadrature signals X' and Y' on respective outputs 4 and 11, receives numerical codes via a line 9 from a read-only memory RM and via a line 10 from an interface unit IB, the latter addressing the memory RM through a connection 12 in order to read out values of sinW and cosW (or sinW* and cosW*), approximating the trigonometric functions $\sin\phi(t)$ and $\cos\phi(t)$, stored therein; the operation of memory RM is timed by clock pulses CK2. Unit IB receives, by way of a line 13, the feedback signal W (or W*) from a digital filter FN stepped by clock pulses CK1. Filter FN, which may be of the recursive type referred to above, averages an error signal V supplied to it via a connection 31 from a logic network LA. This network, obtaining signals c, X'' (or X') and Y' on respective lines 1, 2 and 11, and filter FN are both stepped by clock pulses CK1.

The relationship between error signal V and feedback signal W in terms of a succession of clock cycles $T_{i-2}$, $T_{i-1}$ and $T_i$ is as follows:

$$W(T_i) = W(T_{i-1}) + K_1 V(T_{i-1}) + K_2 [V(T_{i-1}) + V(T_{i-2})] \tag{7}$$

if only three consecutive clock cycles are considered, which is usually sufficient. The same applies, of course, to signal W*.

Parameters $K_1$ and $K_2$ in the foregoing equation represent two constants determined by the bandwidth and the damping coefficient of the feedback loop including units LA, FN and IB. These parameters are inherent in the circuits employed and are similar in character to gain coefficients such as $b_1$, $b_2$ etc. in U.S. Pat. No. 3,984,789.

Figure 3:
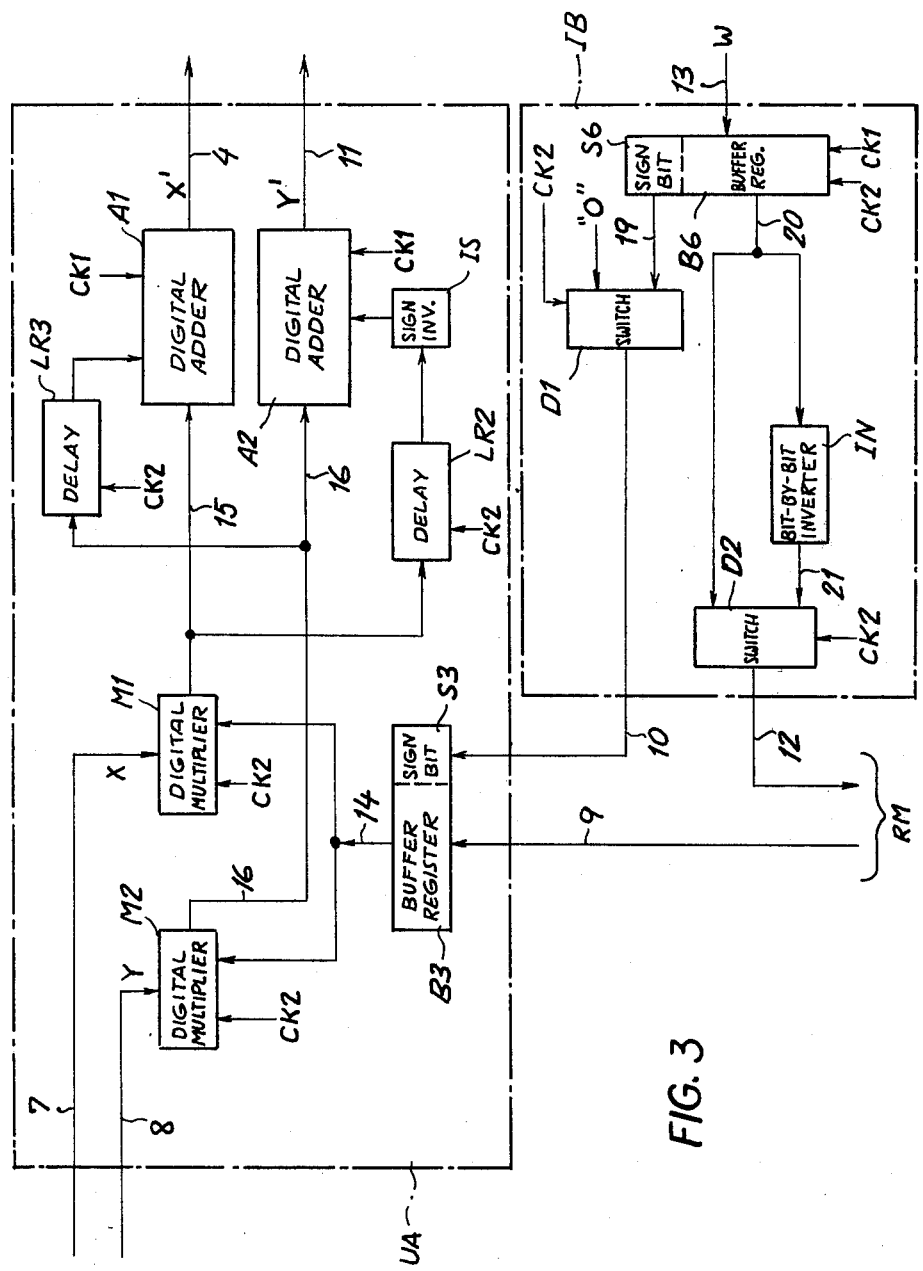
FIG. 3 is a diagram showing additional details of an arithmetic unit and an interface unit illustrated in block form in FIG. 2.

As shown in FIG. 3, arithmetic unit UA comprises a pair of conventional digital multipliers M1 and M2 respectively receiving the raw signals X and Y over input multiples 7 and 8. Lines 9 and 10, carrying the trigonometric codes from memory RM and a sign bit from interface unit IB, terminate at a buffer register B3 having a special cell S3 for the sign bit; register B3 works through a connection 14 into the two multipliers M1 and M2. Output multiples 15 and 16 of multipliers M1 and M2 extend to respective digital adders A1 and A2; a branch of multiple 15, including a delay line LR2 in series with a sign inverter IS, extends to adder A2 while a branch of multiple 16, including only a delay line LR3, extends to adder A1. The two multipliers and the two delay lines (constituted by one-stage buffer registers) are stepped by clock pulses CK2; adders A1 and A2, whose outputs are the lines 4 and 11 carrying the corrected signals X' and Y', receive clock pulses CK1.

As further shown in FIG. 3, feedback signal W (or W*) on line 13 arrives at a buffer register B6 with a cell S6 for its sign bit, this register receiving clock pulses CK1 for loading and CK2 for unloading. The latter clock pulses also periodically reverse a pair of switches or multiplexers D1 and D2 working into outgoing lines 10 and 12, respectively. Switch D1 has one input permanently carrying a logical "0", representing a positive sign bit, and another input connected with register cell S6 via a lead 19. Switch D2 has an input directly connected through a multiple 20 to the remaining cells of buffer register B6 and another input connected to the same register cells through a bit-by-bit inverter IN and a multiple 21. Register B6, like register B3, may be of the simple parallel/parallel type.

Circuit IN, by replacing each bit on multiple 20 with its inversion, converts a given phase angle W by its complement $(\pi/2) - W$ if W is measured only within the first quadrant, i.e., if $(\pi/2)$ is represented by an all-1 word on multiple 20. Thus, a reversal of switch D2 replaces the digitized value of $|\cos W|$ on multiple 9 by that of its complement $|\cos(\pi/2 - W)| = |\sin W|$.

Figure 4:
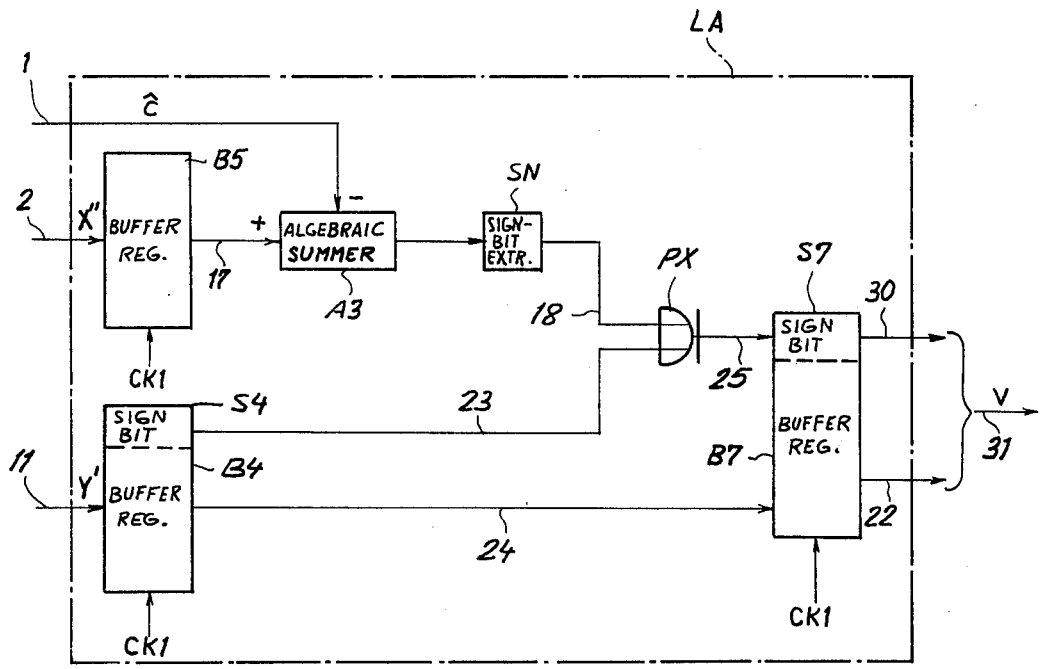
FIG. 4 shows additional details of a logic network included in FIG. 2.

FIG. 4 shows logic network LA as comprising three further registers B4, B5 and B7, the separate cells for the sign bit having been indicated at S4 and S7 in the case of registers B4 and B7. Buffer register B5 receives in-phase output signal X" (or X') on multiple 2 and feeds it by a connection 17 to a positive input of an algebraic summer A3 also receiving on a negative input the reference signal $\hat{c}$ on multiple 1. Register B4 receives quadrature output signal Y' on multiple 11 and delivers it, except for the sign bit, to corresponding cells of register B7 by way of a multiple 24; the sign bit from register cell S4 is fed via a lead 23 to an input of an Exclusive-OR gate PX also receiving on a lead 18 a sign bit derived from the output of summing circuit A3 by a sign-bit extractor SN. XOR gate PX works into register cell S7 via a lead 25. Registers B4, B5 and B7 are stepped by clock pulses CK1. An output lead 30 from cell S7 and a conductor multiple 22 from the other cells of register B7 merge into line 31 carrying the error signal V.

Figure 5:
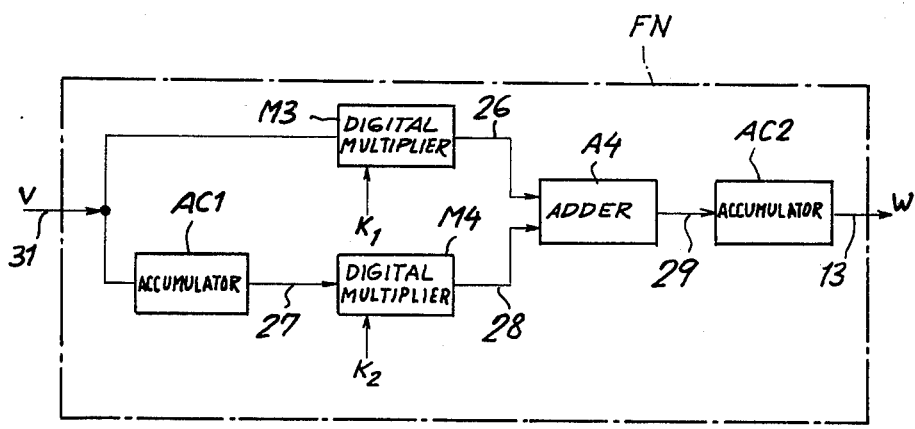
FIG. 5 shows details of a digital filter also included in FIG. 2.

In FIG. 5 we have illustrated a mode of realization of digital filter FN comprising an integrating accumulator AC1 which receives the arriving error signal, in parallel with a digital multiplier M3, from line 31. Multiplier M3 also obtains the parameter $K_1$ from a local source while another such multiplier M4, connected to accumulator AC1 via a line 27, receives the locally generated parameter $K_2$. Outputs 26 and 28 of multipliers M3 and M4 terminate at an adder A4 whose output 29 feeds another, downstream integrating accumulator AC2 which generates the feedback signal W or W* on multiple 13, depending on whether signal V encompasses all the bits present on conductors 22, 30 or consists only of the sign bit on lead 30. Unit FN could be expanded with the addition of further branch paths working into adder A4, with accumulators of larger time constants upstream of respective multipliers serving to weight the combined error signals from two or more clock cycles with other predetermined constants inherent in the circuitry.

OPERATION

Let us consider a feedback signal in the form of a multibit word W loaded at the beginning of a clock cycle T, under the control of a pulse CK1, into register B6 of interface unit IB (FIG. 3). In the first half of this cycle, i.e. during an interval $\tau'$, this stored signal is read out over lines 19 and 20 to switches D1 and D2 which at this instant are assumed to stand on their lower inputs. The modulus bits of word W are therefore complemented in inverter IN and fed on its output 21 to the address input 12 of memory RM which emits, say, the function $|\sin W|$ on its output 9 to the modulus cells of register B3. Since the sine function has the same polarity as the signal W for angles of absolute magnitudes less than $(\pi/2)$, lead 10 carries the sign bit from cell S6 of register B6 to cell S3 of register B3. Inasmuch as signal W (or W*) approximates the corrective angle $\phi(t)$, we shall consider register B3 as containing the trigonometric function $\sin\phi(t)$ at this time.

Signals X and Y, present during this clock cycle on inputs 7 and 8 of arithmetic unit UA, reach multipliers M1 and M2 simultaneously with the sine function appearing in the output 14 of register B3. During this interval $\tau'$, therefore, multiplier M2 generates the second term of equation (5') and delivers it via line 16 into adder A2 as well as to delay line LR3 in parallel therewith. At the same time, multiplier M1 generates the first term of equation (5") and feeds it, via line 15, to adder A1 and delay line LR2 in parallel. Since buffer registers B4 and B5 of logic network LA (FIG. 4) are not stepped at this time, the contents of adders A1 and A2 during interval $\tau'$ are irrelevant.

In the second half $\tau''$ of cycle T, switches D1 and D2 are reversed by a clock pulse CK2 while the contents of register B6 are read again. Inverter IN is now bypassed so that the modulus of signal W is transmitted unchanged by switch D2 to address input 12. Since the cosine function is positive for both positive and negative angles in the first and fourth quadrants, lead 10 invariably carries at this time a logical 0 to indicte this polarity. Register B3, receiving the value of cosW from memory RM, may be regarded as containing the trigonometric function $\cos\phi(t)$ during this interval.

In interval $\tau''$, therefore, multiplier M2 generates the second term of equation (5") and feeds it on its output 16 to adder A2 receiving concurrently, through sign inverter IS, the first term of that equation stored in delay line LR2 during the immediately preceding interval $\tau'$. Simultaneously, multiplier M1 generates the first term of equation (5') and delivers it on its output 15 to adder A1 also receiving the second term of this equation previously stored in delay line LR3. Thus, equations (5') and (5") are implemented by unit UA, with transmission of signals X' and Y' to registers B4 and B5 under the control of clock pulse CK1 at the end of the cycle.

Signal X", representing the signal X' as modified by equalizer EQ, is stored in register B5 long enough to allow for its quantization in circuit DC to produce the signal $\hat{c}$ arriving over lead 1 on the negative input of adder A3. The latter, on receiving the contents of register B5 on its positive input via connection 17, performs the subtraction $(X'-\hat{c})$ of equation (3) or (4) and delivers the difference to extractor SN whose output is the sign bit $S(X'-\hat{c})$. This sign bit reaches the XOR gate PX concurrently with the sign bit of signal Y', stored in cell S4 of register B4, so that this gate carries out the multiplication $S(X'-\hat{c})\cdot S(Y')$. Thus, if both bits are 0 (positive) or 1 (negative), the output of gate PX will be 0 (positive); in all other instances it will be 1 (negative). This output, on lead 25, will suffice for the generation of feedback signal W* according to equation (4), with connection 24 remaining unused; signal W, as per equation (3), requires merely the transmission of the modulus bits from register B4 to corresponding cells of register B7 to supplement the sign bit loaded into cell S7.

The signal V issuing from network LA (on line 30 alone or on both lines 22 and 30) is integrated in the digital filter FN, FIG. 5, according to equation (7). Thus, error signal V occurring on input 31 during a cycle $T_{i\cdot1}$ is multiplied by constant $K_1$ in circuit M3 and is superimposed upon the corresponding signal from the preceding cycle $T_{i\cdot2}$ in accumulator AC1 whose output on line 27 is multiplied by constant $K_2$ in circuit M4. The two multiplication products are combined in adder A4 downstream of the two multipliers and, during the next cycle $T_i$, are superimposed in accumulator AC2 further downstream upon the previously synthesized signal $W(T_{i\cdot1})$ to yield the signal $W(T_i)$. This completes the feedback loop.

Our improved phase corrector can be used with any linearly coded digital signals since no decoding of the transmitted characters is required for its operation. Units LA and FN, generating and averaging the error signal V, are separate from the phase-correcting unit UA and can therefore be independently modified, e.g. for the purpose of accommodating situations in which the phase fluctuations or jitters are much faster or much slower than originally envisaged. In systems using amplitude rather than phase modulation, as shown in FIG. 1B, the linear transformation utilized in filter FT will have to be suitably modified.

We claim:

1. A method of correcting distortions due to phase errors in a train of data signals recovered during successive clock cycles by noncoherent demodulation from an asymmetrically modulated carrier, comprising the steps of:
   deriving a train of raw bipolar quadrature signals from the train of recovered raw bipolar data signals;
   cross-multiplying said raw data signals and said raw quadrature signals with two mutually conjugate trigonometric functions of a magnitude substantially compensating said phase errors, thereby generating corrected bipolar in-phase signals and corrected bipolar quadrature signals;
   generating a series of reference signals by quantizing said corrected in-phase signals;
   obtaining a succession of bipolar difference signals by subtractively combining said corrected in-phase signals and said reference signals;
   multiplying at least parts of said difference signals with at least parts of said corrected quadrature signals to produce bipolar error signals of a polarity which is the product of the polarities of said difference signals and of said corrected quadrature signals;
   averaging said error signals over a plurality of clock cycles to obtain a succession of corrective bipolar feedback signals; and
   deriving said trigonometric functions from said feedback signals.

2. A method as defined in claim 1 wherein all said bipolar signals are digitized and provided with sign bits representing their polarities, said error signals being produced by multiplying at least the sign bits of said corrected quadrature signals with the sign bits of said difference signals.

3. In a system for recovering a train of bipolar data signals during successive clock cycles by noncoherent demodulation from an asymmetrically modulated carrier, including a local time base for establishing said clock cycles and a component circuit for correcting distortion of said data signals due to phase errors, the improvement wherein said component comprises:
   transformation means for deriving a train of raw bipolar quadrature signals from a train of recovered raw data signals;
   an arithmetic unit with a first input for receiving said raw data signals, a second input connected to said transformation means for receiving said raw quadrature signals, a first output for emitting corrected bipolar in-phase signals, and a second output for emitting corrected bipolar quadrature signals;
   decision means connected to said first output for producing a series of reference signals by quantizing said corrected in-phase signals;
   algebraic summing means with input connections to said first output and to said decision means for generating a succession of bipolar difference signals by subtractively combining said corrected in-phase signals and said reference signals;
   multiplication means connected to said algebraic summing means and to said second output for producing bipolar error signals of a polarity which is the product of the polarities of said difference signals and said corrected quadrature signals;
   integrating means controlled by said time base and connected to said multiplication means for producing a succession of corrective bipolar feedback signals representative of phase angle;
   conversion means connected to said integrating means for translating each of said feedback signals into a pair of conjugate trigonometric functions thereof; and
   calculating means in said arithmetic unit inserted between said inputs and outputs thereof and connected to said conversion means for synthesizing said corrected in-phase and quadrature signals by cross-multiplying said raw data signals and said raw quadrature signals with said conjugate trigonometric functions.

4. The improvement defined in claim 3 wherein said raw data signals are digitized, said transformation means comprising a digital filter.

5. The improvement defined in claim 4 wherein said calculating means comprises a first digital multiplier with input leads connected to said first input and to said conversion means, a second digital multiplier with input leads connected to said second input and to said conversion means, a first digital adder inserted between output leads of said first multiplier and said first output, and a second digital adder inserted between output leads of said second multiplier and said second output.

6. The improvement defined in claim 5 wherein said conversion means comprises a memory storing said trigonometric functions, switch means controlled by said time base between said integrating means and an address input of said memory for reading out sine and cosine functions of a feedback signal during different portions of a clock cycle, and delay means inserted between each of said multipliers and a respective digital adder in said arithmetic unit for temporarily storing the products of one of said functions until the generation of the products of the other of said functions.

7. The improvement defined in claim 6, further comprising register means inserted between said integrating means and said switch means for storing during a clock cycle a multibit word constituting said feedback signal, said multibit word including a polarity-indicating sign bit and a plurality of modulus bits, and inversion means controlled by said switch means for complementing said modulus bits during one of said portions of a clock cycle.

8. The improvement defined in claim 4 wherein said multiplication means comprises logical circuitry for isolating a first polarity-indicating sign bit from each of said difference signals and a second polarity-indicating sign bit from each of said corrected quadrature signals and for assigning to each of said error signals a polarity-indicating sign bit indicative of the product of the polarities of said difference signals and corrected quadrature signals.

9. The improvement defined in claim 8 wherein said sign bits have a logical value 0 for positive polarities, said logical circuitry comprising an Exclusive-OR gate with inputs connected to receive said first and second sign bits.

10. The improvement defined in claim 9 wherein said multiplication means further comprises storage means with a sign-bit cell connected to said Exclusive-OR gate and with additional cells connected to said second output for receiving modulus bits of each of said corrected quadrature signals.

11. The improvement defined in claim 4 wherein said integrating means comprises a plurality of branch paths including respective digital multipliers for weighting said error signals with predetermined constants, a digital accumulator in each but one of said branch paths upstream of the respective digital multiplier thereof, and adding means with inputs connected to all said branch paths downstream of all said digital multipliers.

12. The improvement defined in claim 11 wherein said integrating means further comprises another digital accumulator downstream of said adding means.

* * * * *